United States Patent [19]

Blakemore

[11] Patent Number: 4,858,483
[45] Date of Patent: Aug. 22, 1989

[54] LEVER ACTION WHEELCHAIR

[76] Inventor: John Blakemore, 1143 S. Taylor St., Oak Park, Ill. 60304

[21] Appl. No.: 301,855

[22] Filed: Jan. 26, 1989

[51] Int. Cl.[4] .................. F16H 27/02; F16H 31/00
[52] U.S. Cl. ................................. 74/143; 74/812; 192/20; 192/41 R
[58] Field of Search ............... 74/141.5, 142, 143, 74/810, 812; 192/20, 21, 41 R

[56] References Cited

U.S. PATENT DOCUMENTS

| | | | |
|---|---|---|---|
| 654,986 | 7/1900 | Krueger | 74/143 |
| 2,407,099 | 3/1946 | Richards | 192/41 R |
| 3,207,005 | 9/1965 | Geyer | 74/812 |
| 3,895,700 | 7/1975 | Kerr | 192/41 R |
| 4,506,900 | 3/1985 | Korosue | 74/142 X |
| 4,762,332 | 8/1988 | Seol | 74/142 X |

Primary Examiner—Dirk Wright
Attorney, Agent, or Firm—Sherman and Shalloway

[57] ABSTRACT

The present invention relates to a torque converter device which is suitable for use incorporated in a wheelchair. The device includes, on each side of the wheelchair, two one-way clutches such as that which is illustrated in FIGS. 10-11 of the U.S. Pat. No. 4,763,544, coupled together with a handle mechanism so that when a user manipulates the handles forward and backward, force is transmitted to the wheels of the wheelchair. By twisting the handles in one direction or another, the directions of movement of the wheelchair may be reversed.

4 Claims, 3 Drawing Sheets

LEVER ACTION WHEELCHAIR

BACKGROUND OF THE INVENTION

This disclosure incorporates, by reference, the disclosure of U.S. Pat. No. 4,763,544 as well as Disclosure Document No. 156,442 filed Sept. 26, 1986 and titled "DOUBLE ACTION REVERSIBLE GEAR DRIVE".

In order to best understand the present invention, reference is made to FIGS. 10 and 11 of the said U.S. Pat. No. 4,763,544.

These Figures show a clutch means usable in conjunction with the torque converter 300 disclosed in the patent application. As shown in FIG. 10, the torque converter 300 with its input shaft 321 and output shaft 331 has further mounted to plate 305 an annular extension member 381 which extends in bearing relation through the housing 401 of the inventive clutch mechanism 400. As shown in FIG. 10, the clutch 400 has mounted in its housing 401 a helical gear 403 which is keyed to the extension 381 by a key member 405 (best seen in FIG. 11). As such, the torque converter 300 may rotate with respect to the housing 401 but is constrained to rotate with helical gear 403 of the clutch 400.

With reference to FIG. 11, it is seen that a pin member 407 pivotally mounts a carrier cage 409 within the clutch housing 401. It is noted that the pin member 407 is laterally offset with respect to the center of worm gear 429. The pivoting of the carrier cage 409 is controlled by a handle 411 which is connected to one end 413 of the carrier cage 409 by a link 415 and a curved rod 417 having an end 427 extending through a hole formed in the end 413 of the carrier cage 409 a distance controlled by the position of the nuts 419.

At the other end 421 of the carrier cage 409, a hole is provided which enables the end 421 to ride up and down on a shaft 423 which has mounted therearound a compression spring 425. As such, viewing the carrier cage 409, as shown in FIG. 11, the spring 425 is operative to tend to pivot the carrier cage 409 in a counterclockwise direction which tendency is resisted by the nuts 419 mounted on the rod 417.

As further seen in FIG. 11, a worm gear 429 is mounted in a saddle portion 431 for the carrier cage 409. In the operation of the inventive clutch 400, when the shifting lever 411 is in the position shown by the full lines in FIG. 11, the gears 403 and 429 are in perfect alignment and the helical gear 403 may rotate freely in either direction. When the shifting lever 411 is moved to the opposite position of its excursion as designated by the phantom lines in FIG. 11, the pressure exerted upon the carrier cage 409 by the nuts 419 is removed therefrom to thereby enable the spring 425 to push downwardly on the end 421 of the carrier cage 409 to thereby enable the carrier cage 409 to pivot about the pin 407 so that worm gear 429 is tipped with respect to the helical gear 403. In particular, this pivoting of the carrier cage 409 causes the centers of the shafts upon which the helical gear 403 and the worm gear 429 are mounted to become less than one-half the sum total of the pitch diameter of the worm gears 403 and 429. It has been found that when this particular relationship exists, the worm gear 403 is free to rotate in the same direction in which the drive shaft 321 is rotating but will not rotate in the opposite direction. Conversely, movement of the shifter lever 411 from the phantom position shown therein will cause the nuts to pivot the carrier cage 409 against the force of the spring 425 to a position where alignment of gears 403 and 429 is regained to thereby enable the gear 403 to rotate in either direction. In further explanation, when the helical gears are mounted on transverse shafts as shown in FIG. 11, if the distance between the centers of the shafts is less than one-half the total sum of the pitch diameters of gears 403 and 429, the static pressure between the crown and the root of the matching gears will tend to counteract the radial pressure of the matching gears where their faces meet. The static pressure will tend to lock the gears, while the radial pressure will tend to rotate these gears in relationship to each other.

When the shaft of the gear 429 is mounted in floating saddle 431, which is in turn is mounted on shaft 407 which is parallel to shaft 331, providing the center of shaft 407 and the center of shaft 331 are properly spaced, gear 431 will be free to rotate in either direction so long as the perpendicular relation of shaft 331 and the shaft on which gear 429 is mounted is maintained.

When the floating saddle 431 is moved from the perpendicular plane, gear 429 will still rotate freely in one direction and will lock in the other direction, depending upon which way the floating saddle 431 is tipped. When gear 403 turns into gear 429 from the side which has more than 90° separation, the gears will rotate freely activated by radial pressure, but when the angle is less than 90°, the gears will lock activated by static pressure.

SUMMARY OF THE INVENTION

The clutch described above with reference to FIGS. 10 and 11 of the patent application Ser. No. 609,235 is a single-acting clutch. This is due to the fact that the pivot pin 407 of the saddle 409 is mounted laterally offset from the center of the worm gear 429. If it is desired to make the clutch device double-acting, it is only necessary to move the pivot pin 407 to a centrally located position with respect to the helical gear. This is seen with reference to FIG. 1 wherein the pivot pin 3 is centrally mounted on the saddle which carries the worm gear 2 rotatably mounted on the shaft 4. In the operation of the device of FIG. 1, so long as the shaft 4 is held at 90° to the center line of the shaft 1 and the shaft 3, the pressure angle of the gear 5 and the gear 2 will be on the sides of the respective gears and the gears will be free to rotate in either direction with no braking power exerted on either gear. When the shaft 4 is tipped to either direction from the 90° position with respect to the center line of shaft 1 and shaft 3, the pressure angle of gear 5 and gear 2 will shift from the sides of the gears involved to the crown on the worm gear teeth and the root of the helical gear teeth and vice versa. In one direction, the braking power of the interaction is nil, because the gears will have no locking tendency, but in the other direction, the pressure angle of the gear crown against the other gear root will lock the gears from rotation. The direction of this locking power will depend upon which direction the worm gear is tipped about the pivot axis of the shaft 3.

Accordingly, it is a first object of the present invention to provide a Lever Action Wheelchair.

It is a further object of the present invention to provide such a Lever Action Wheelchair including two hand manipulated devices which may transfer torque from arm movements of the user to movements of the wheelchair in either direction.

It is a yet further object of the present invention to provide such a Lever Action Wheelchair which may easily be turned and manipulated in whatever direction is desired.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
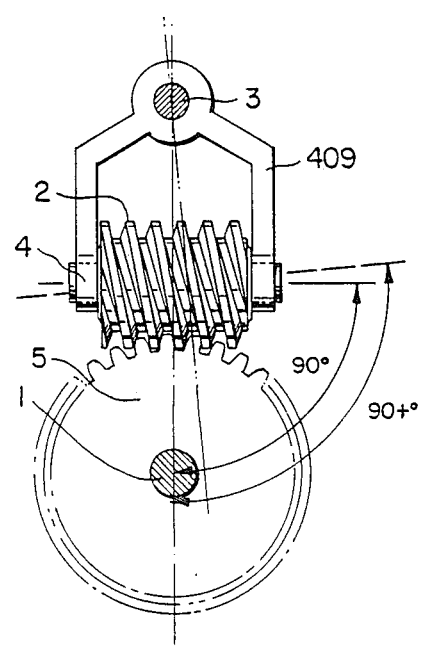
FIG. 1 shows a side view of a double acting clutch in accordance with the teachings of the present invention.
Figure 2:
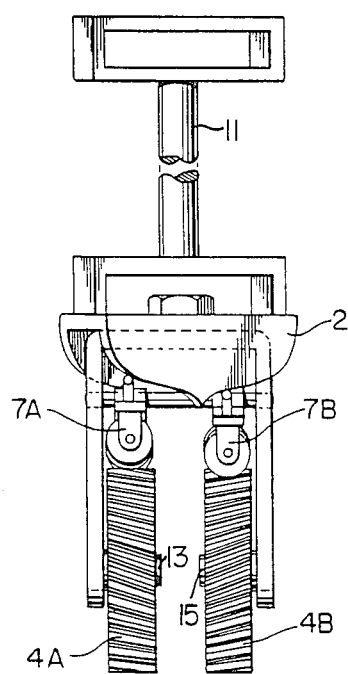
FIG. 2 shows two double acting clutches such as that which is illustrated in FIG. 1, coupled together to provide torque converter, seen from the front.
Figure 3:
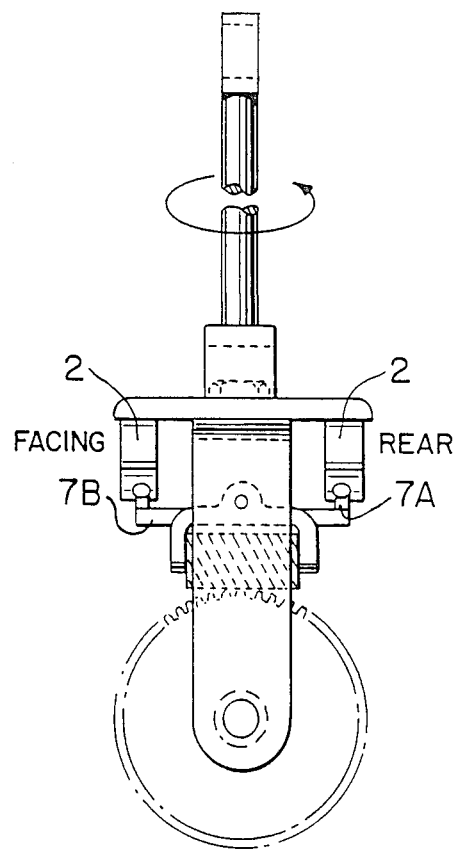
FIG. 3 shows a side view of the device illustrated in FIG. 2.
Figure 4:
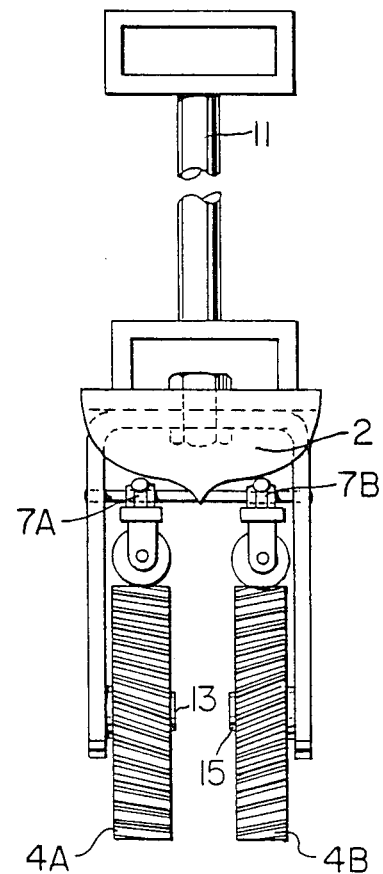
FIG. 4 shows a further front view of the device illustrated in FIG. 2, but in a different orientation of parts thereof.
Figure 5:
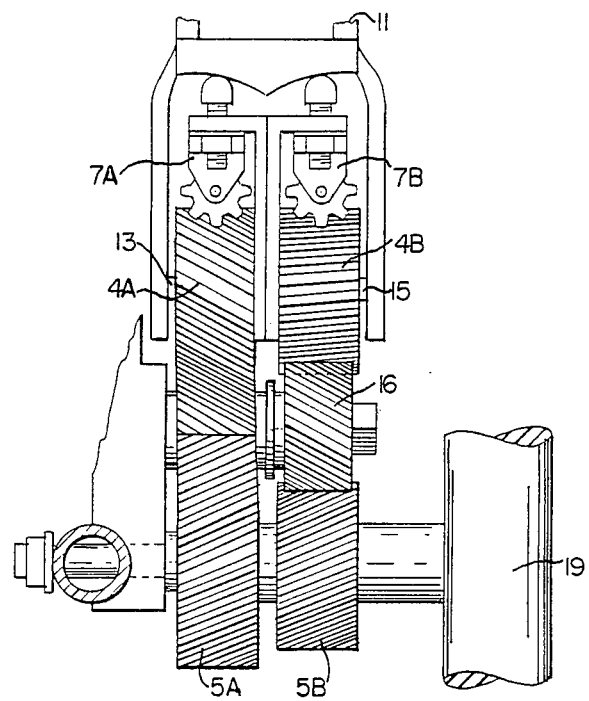
FIGS. 5 and 6 show a gear train in two orientations thereof which forms a part of the present invention.

The device illustrated in FIGS. 10 and 11 of U.S. Pat. No. 4,763,544, modified as illustrated in FIG. 1 and explained hereinabove, may be used in the Lever Action Wheelchair. In this regard, reference is made to the above-described Disclosure Document and FIGS. 2, 3, and 4. FIGS. 2, 3, and 4 should be reviewed in conjunction with FIGS. 5 and 6 which correspond to FIGS. V and VI of the Disclosure Document. FIG. 5 shows helical gear 4-A and helical gear 4-B. FIGS. 2 and 4 identify helical gears 4-A and 4-B to further explain the double action reversible drive system. FIG. 3 and FIG. 4 show the drive system in neutral. The drive handle 11 in FIG. 3 and FIG. 4 is seen to be parallel to the drive shafts 13, 15 upon which helical gears 4-A and 4-B are mounted. In this position the drive lever will not engage the drive gears regardless of which way it is moved, and the drive wheels will be free to rotate freely in either direction. In FIG. 2 the drive handle is seen to be turned from the parallel position. At this handle position, cam 2 forces worm gear carrier 7-B downward as we view it from this side, while forcing carrier 7-A downward from the back side. (That of course forces carrier 7-A upward on the side facing us. While in this mode, should the handle be pulled toward us, 7-A gear clutch would freewheel, while 7-B gear clutch would lock onto helical gear 4-B and rotate 4-B toward us. When the lever stroke is pushed from us, worm gear carrier 7-B is tilted downward facing us, and will therefore allow worm gear 7-B to freewheel on helical drive gear 4 B. Worm gear carrier 7-A facing us is tilted upward and therefore locks worm gear 7-A to helical drive gear 4-A.

Figure 6:
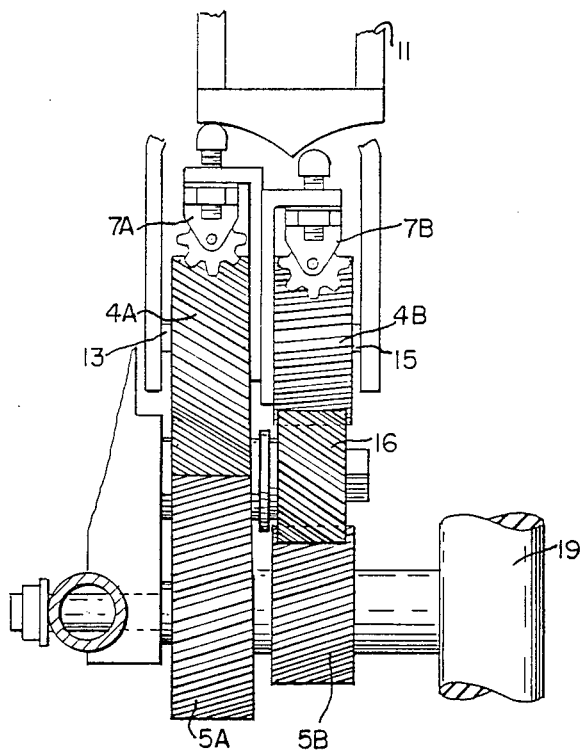

Directing our attention now to FIG. 6 we see driven helical gear 5-A and driven helical gear 5-B both attached to the right drive wheel of the wheelchair as viewed from the rear with the wheel designated by the reference numeral 19. It should be understood that drive gear 4-A and driven gear 5-A are enmeshed constantly, and that drive gear 4-B and driven gear 5-B are connected by idler gear 16. By following the direction of rotation of the drive gears 4-A and 4-B it will be noted that whether pulled or pushed, the force exerted on the drive lever will rotate the drive wheel of the wheelchair in reverse (remember, we are viewing the drive system from behind the wheelchair). Also, it will be understood that by reversing the direction of cam 2, the wheelchair will be moved forward whether the lever is pulled or pushed.

As such, it should be understood that the Lever Action Wheelchair takes the concept of the one-way clutch as disclosed in FIGS. 10 and 11 of U.S. Pat. No. 4,763,544 and adapts the one-way clutch thereof to a new application, to wit, that of facilitating the easy operation of a wheelchair.

In further explanation, as is well-known, a conventional wheelchair includes two large rear wheels. The right-hand wheel, designated by the reference numeral 19 is shown in FIGS. 5 and 6. The same wheelchair would have a left-hand wheel (not shown) to which an additional Lever Action device is installed in the same manner of installation as best seen in FIGS. 5 and 6 herein.

Such installation would include two one-way clutches coupled together in the same manner as the device illustrated in FIGS. 2, 6 with such device being installed on the drive axle of the wheelchair for the left-hand wheel with one 1-way clutch directly connected to a gear mounted on the driveshaft and with the other interconnected with a gear on the driveshaft via an idler gear such as the gear 16 seen FIGS. 5 and 6. In this way, movements of the handle 11 in either direction will result in movements of the wheel in the same direction.

As such, a user of such a wheelchair may sit in the seat and may grasp each handle with one hand. The handles are appropriately twisted as desired depending upon whether the user wishes to move forward or backward. If desired, one handle may be twisted to cause the associated wheel to move forward while the other handle is twisted to cause the associated wheel to move backward where sharp turns are desired. Where turns of a larger radius are desired, one wheel torque converter may be placed in a neutral position while the other is twisted and then moved to move the other wheel forward or backward as desired.

As such, an invention has been disclosed in terms of a preferred embodiment thereof which fulfills each and every one of the objects of the invention .as set forth hereinabove and provides a device for manually propelling a wheelchair which is far superior to any means known in the prior art. Of course, various changes, modifications and alterations in the teachings of the present invention may be contemplated by those skilled in the art without departing from the intended spirit and scope of the present invention. As such, it is intended that the present invention only be limited by the terms of the appended claims.

It is further understood that this illustration does not limit the mechanical action herein described to wheelchairs, but rather that this unique mechanical action made possible by our reversible overrunning gear clutch is applicable to any operation where reciprocal power need be converted to circular motion.

I claim:

1. An improved torque convertor comprising:
   (a) frame means having first shaft means rotatably carrying first and second spaced helical gears and second shaft means rotatably carrying first and second carrier cage means; said first and second shaft means being substantially parallel to one another;

(b) said first carrier cage means carrying a first rotatable worm gear engageable with said first helical gear in different orientations thereof and said second carrier cage means carrying a second rotatable worm gear engageable with said second helical gear in different orientations thereof;

(c) cam means mounted on said frame means for rotation in a direction substantially normal to the direction of rotation of said first and second carrier cage means, said cam means having cam surfaces engageable with said first and second carrier cage means, said cam means having a first neutral position wherein said cam surfaces maintain said first and second carrier cage means in alignment with one another, a second position wherein said cam surfaces engage said first and second carrier cage means moving said first carrier cage means in a clockwise direction and said second carrier cage means in a counterclockwise direction, and a third position wherein said cam surfaces engage the first and second carrier cage means moving said first carrier cage means in a counterclockwise direction and said second carrier cage means in a clockwise direction;

(d) handle means connected to said cam means for controlling rotations thereof as well as pivoting of said frame means;

(e) a first driven gear enmeshed with said first helical gear and fixed to a driven shaft; and (f) a second driver gear drivingly connected to said second helical gear via an idler gear, said second driver gear being fixed to said driven shaft;

(g) whereby pivoting of said frame consecutively in first and second directions with said cam means in said second position rotates said driven shaft in a first direction, and pivoting of said frame consecutively in said first and second directions with said cam means in said third position rotates said driven shaft in a second opposite direction.

2. The invention of claim 1, wherein said driven shaft is mounted on a frame of a wheelchair.

3. The invention of claim 2, wherein said improved torque convertor comprises a first torque convertor mounted on one end of said driven shaft, and a second like torque convertor mounted on a second end of said driven shaft.

4. The invention of claim 1, wherein said second shaft means is centrally located with respect to the longitudinal extent of each of said worm gears.

* * * * *